(12) United States Patent
De Grancey et al.

(10) Patent No.: US 12,252,237 B2
(45) Date of Patent: Mar. 18, 2025

(54) ELECTRONIC CONTROL DEVICE FOR AN AVIONICS SYSTEM FOR IMPLEMENTING A CRITICAL AVIONICS FUNCTION, METHOD AND COMPUTER PROGRAM THEREFOR

(71) Applicant: THALES, Courbevoie (FR)

(72) Inventors: Florence De Grancey, Toulouse (FR); Sébastien Boussiron, Mérignac (FR)

(73) Assignee: THALES, Courbevoie (FR)

( * ) Notice: Subject to any disclaimer, the term of this patent is extended or adjusted under 35 U.S.C. 154(b) by 287 days.

(21) Appl. No.: 17/748,942

(22) Filed: May 19, 2022

(65) Prior Publication Data
US 2022/0380024 A1  Dec. 1, 2022

(30) Foreign Application Priority Data
May 25, 2021  (FR) .................................... 21 05401

(51) Int. Cl.
*G06F 40/284* (2020.01)
*B64C 19/00* (2006.01)
(Continued)

(52) U.S. Cl.
CPC ............ *B64C 19/00* (2013.01); *G06F 40/284* (2020.01); *G10L 15/18* (2013.01); *G10L 15/22* (2013.01);
(Continued)

(58) Field of Classification Search
None
See application file for complete search history.

(56) References Cited

U.S. PATENT DOCUMENTS 8,595,642 B1  11/2013 Lagassey
11,423,787 B1 *  8/2022 Herbst ................ G06F 3/04817
(Continued)

FOREIGN PATENT DOCUMENTS

CN  108986791 A  12/2018

OTHER PUBLICATIONS

French Search Report, from the French Patent Office in counterpart French Application No. 2105401, dated Feb. 4, 2022.
(Continued)

*Primary Examiner* — Quynh H Nguyen
(74) *Attorney, Agent, or Firm* — ArentFox Schiff LLP

(57) ABSTRACT

An electronic control device of an avionics system for implementation of a critical avionics function, comprising:
  a module for receiving a voice instruction signal;
  a speech recognition module configured to transform the voice signal into a textual transcript;
  a processing module configured to associate the textual transcript with at least one action to be performed;
  a monitoring system comprising:
    a control module configured to check whether the textual transcript and/or the action to be performed is consistent if and only if:
      a) the textual transcript and/or the action to be performed is consistent with the expected syntax,
      b) the textual transcript and/or the action to be performed is consistent with the expected lexical field, and
      c) the textual transcript and/or the action to be performed is consistent with the current context,
    a module for generating an associated command only if no inconsistencies are detected.

7 Claims, 3 Drawing Sheets

(51) Int. Cl.
   *G10L 15/18* (2013.01)
   *G10L 15/22* (2006.01)

(52) U.S. Cl.
   CPC .. *G10L 2015/223* (2013.01); *G10L 2015/228* (2013.01)

(56) References Cited

U.S. PATENT DOCUMENTS

| | | |
|---|---|---|
| 2011/0224849 A1 | 9/2011 | Braly et al. |
| 2013/0197917 A1 | 8/2013 | Dong et al. |
| 2015/0217870 A1* | 8/2015 | McCullough ........... G10L 15/22 704/275 |
| 2016/0297543 A1 | 10/2016 | Li et al. |
| 2016/0322044 A1 | 11/2016 | Jung et al. |
| 2017/0032576 A1 | 2/2017 | Mazoyer et al. |
| 2018/0260856 A1* | 9/2018 | Balasubramanian ........................ G06F 40/211 |
| 2019/0332680 A1 | 10/2019 | Wang et al. |

OTHER PUBLICATIONS

Falkenstine, S., et al., "Natural Language Processing for Autonomous Identification of Impactful Changes to Specification Documents," 2020 AIAA/IEEE 39th Digital Avionics Systems Conference (DASC), San Antonio, TX, USA, 2020, pp. 1-9, doi: 10.1109/DASC50938.2020.9256611.

* cited by examiner

ELECTRONIC CONTROL DEVICE FOR AN AVIONICS SYSTEM FOR IMPLEMENTING A CRITICAL AVIONICS FUNCTION, METHOD AND COMPUTER PROGRAM THEREFOR

CROSS-REFERENCE TO RELATED APPLICATIONS

This application is a U.S. non-provisional application claiming the benefit of French Application No. 21 05401, filed on May 25, 2021, which is incorporated herein by reference in its entirety.

FIELD OF THE INVENTION

The present invention relates to an electronic control device of an avionics system for the implementation of a critical avionics function.

The present invention further relates to a method for controlling an avionics system for the implementation of a critical avionics function.

The present invention further relates to a computer program comprising software instructions which, when executed by a computer, implement such a method.

BACKGROUND

The avionics system is, for example, on board an aircraft or in a remote control station of an aircraft or in a control station of the aircraft.

The invention relates to the implementation of critical avionics functions, i.e. those that are critical to the safety of the associated aircraft, operators, passengers and/or the aircraft environment.

Examples of such critical functions are flight controls or communication with the outside of the aircraft.

In particular, in the field of avionics, a critical function is defined by the ARP-4754A standard (Aerospace Recommended Practice).

By implementation of a critical function, we mean the carrying out of one or more calculations making it possible to generate at least one output associated with this critical function, from at least one input.

The invention relates in particular to supporting an operator of the critical avionics system to facilitate interfacing and communication between said avionics system and the operator via voice commands from the operator to the avionics system.

Voice-activated assistance systems are known for domestic applications, assistance services for intelligent equipment, particularly for smartphones, or car assistance systems for call management, for example. These systems are based in particular on artificial intelligence algorithms which enable attractive levels of performance to be obtained with an error rate of 5 to 10%.

In addition, these algorithms have many vulnerabilities, such as adversarial examples for neural network algorithms, guarantee problems when the current input of the system is not in the training database for all machine-learning-based components, and modelling or vocabulary definition limitations for semantic engines. These different vulnerabilities can lead to errors in the processing of the voice command. In the above examples, an error in the processing of the voice command has a non-critical impact, such as calling the wrong person.

However, in the context of supporting avionics systems implementing a critical avionics function, the sending of an erroneous command can have serious consequences for the safety of the aircraft. For example, an unwanted change in the direction of the aircraft by the pilot can have significant consequences for the safety of the aircraft and its environment.

There is therefore a need for an electronic control device for an avionics system that facilitates an operator's interaction with that avionics system while being sufficiently safe for the implementation of a critical avionics function.

SUMMARY

To this end, the subject matter of the invention is an electronic control device for an avionics system for implementing a critical avionics function, the avionics system being suitable for operating according to a current context defined by at least one operating parameter associated with the avionics system, the electronic control device comprising:

- a reception module configured to receive a voice instruction signal picked up by a microphone and to receive the current context;
- a speech recognition module configured to transform the voice signal into a textual transcript of said voice signal;
- a processing module configured to carry out a processing of the textual transcript in order to associate the textual transcript with at least one action to be performed for the avionics system;
- a monitoring device configured to receive the text transcript and/or the action to be performed, the monitoring device comprising:
  - a control module configured to check whether the textual transcript and/or the action to be performed is consistent according to at least one predetermined consistency rule, the textual transcript and/or the action to be performed being considered consistent according to the consistency rule if and only if:
    a) the textual transcript and/or the action to be performed is consistent with the expected syntax according to a predetermined database of syntax rules,
    b) the textual transcript and/or the action to be performed is consistent with the expected lexical field according to a predetermined database of the expected lexical field in the current context of the avionics system, and
    c) the textual transcript and/or the action to be performed is consistent with the current context of the avionics system,
  - a generating module configured to generate a command associated with the action to be performed only if no inconsistency is detected by the control module.

In other beneficial aspects of the invention, the electronic device comprises one or more of the following features, taken in isolation or in any technically possible combination:
- the electronic device comprises a transmission module configured to transmit the command to the avionics system for implementation of the critical avionics function;
- the electronic device further comprises a validation module configured to display the command(s) to an operator of the avionics system prior to transmission of the command to the avionics system, the validation module being configured to receive validation of each command from the operator and to send the command to the transmission module only after receipt of validation of the command by the operator;

the monitoring device further comprises an alert module configured to generate an alert signal when an inconsistency is detected by the control module;

each operating parameter associated with the avionics system is selected from the group consisting of: a flight parameter of an aircraft associated with the avionics system; a flight plan associated with the aircraft; a mission assigned to the aircraft; a parameter from at least one avionics sensor; a weather parameter associated with the aircraft's environment; and a physiological parameter of an operator of the avionics system;

the processing module comprises an automatic language processing module configured to perform at least one process selected from: lemmatisation of the textual transcript; stemming of the textual transcript; recognition of keywords and/or named entities in the textual transcript;

the processing module comprises a natural language understanding module configured to perform at least one process selected from: recognition of textual patterns in the textual transcript; association of the textual transcript with at least one concept stored in a database; use of a semantic engine to link sequences of words in the textual transcript to the at least one concept; and application of a neural network to detect feelings and/or intentions in the textual transcript;

the monitoring device further comprises an activation module configured to: activate the automatic language processing module; analyse whether the action to be performed obtained by the processing carried out by the automatic language processing module allows the generating of a command by the generating module; activate the natural language understanding module only if the action to be performed does not allow the generation of a command by the generating module.

The invention further relates to a method of controlling an avionics system to implement a critical avionics function, the avionics system being suitable for operation in a current context defined by at least one operating parameter associated with the avionics system, the method being implemented by an electronic control device and comprising the following steps receipt of a voice instruction signal acquired by a microphone and receipt of the local context;

transforming the voice signal into a textual transcript of the voice signal;

processing the textual transcript in order to associate the textual transcript with at least one action to be performed for the avionics system;

checking whether the textual transcript and/or the action to be performed is consistent according to at least one predetermined consistency rule, the textual transcript and/or the action to be performed being considered consistent according to the consistency rule if and only if:

a) the textual transcript and/or the action to be performed is consistent with the expected syntax according to a predetermined database of syntax rules, b) the textual transcript and/or the action to be performed is consistent with the expected lexical field according to a predetermined database of the expected lexical field in the current context of the avionics system, and c) the textual transcript and/or the action to be performed is consistent with the current context of the avionics system, generating a control signal associated with the action to be performed only if no inconsistencies are detected.

The invention also relates to a non-transitory computer-readable medium including a computer program comprising software instructions, which, when carried out by a computer, implement a method as defined above.

BRIEF DESCRIPTION OF THE DRAWINGS

These features and advantages of the invention will appear more clearly upon reading the following description, given solely as a non-limiting example, and made in reference to the attached drawings, in which.

DETAILED DESCRIPTION

Figure 1:
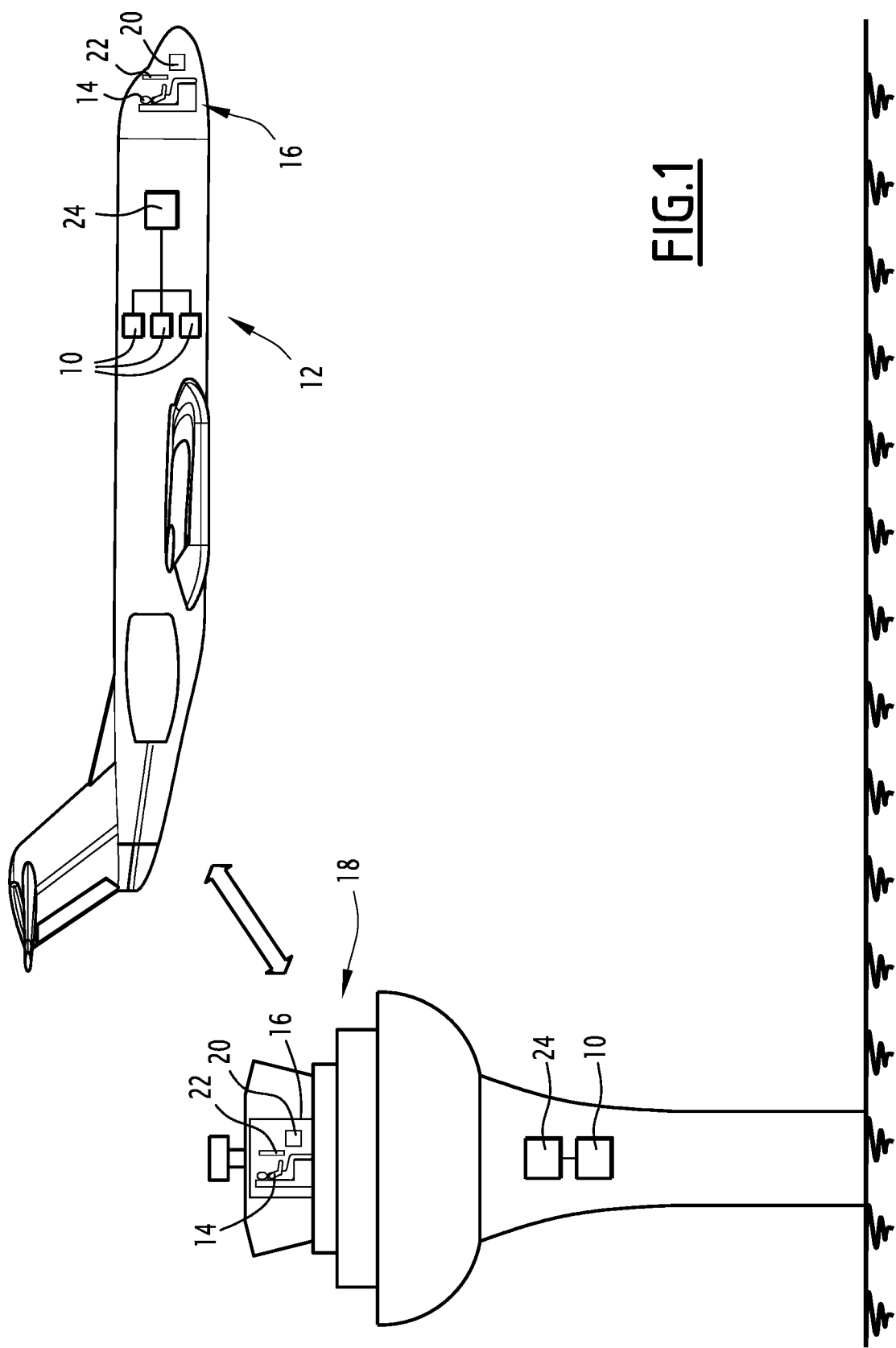
FIG. 1 is a schematic depiction of an aircraft and a control room each comprising an electronic device according to the invention.

A plurality of avionics systems 10 are shown in FIG. 1.

In particular, the avionics system 10 is carried in an aircraft 12. The aircraft is typically an aeroplane, a helicopter, or a drone. In other words, the aircraft 12 is a flying machine that can be piloted by an operator 14, here a pilot, via a control station 16. The control station 16 is located inside the aircraft 12 or at a distance away from the aircraft 12, particularly in the case of a drone.

Alternatively, as also shown in FIG. 1, the avionics system 10 is embedded in a ground control room 18, such as a control tower in an airfield. The operator 14 controls the air traffic and in particular the aircraft 12 via the control station 16 located in the control room 18.

As shown in FIG. 1, the control station 16 particularly comprises a microphone 20 facing the operator 14. The microphone 20 is configured to pick up a voice signal from the operator 14.

The control station 16 further includes a display screen 22. The display screen 22 is for example a head-down display. The screen in such a case is a surface configured to display at least one image. Advantageously, the head-down display is configured to display information relating to the aircraft 12, such as speed, altitude, orientation of the aircraft 12 and/or information relating to the external environment of the aircraft 12, such as air traffic information and weather conditions in the vicinity of the aircraft 12.

In one variant, the display screen 22 is a head-up display. The screen is then at least partially transparent. Advantageously, the head-up display is a visor integrated into a helmet suitable for wearing by the operator 14. Alternatively, the head-up display is a transparent surface fixed in the control station 16 and placed in front of the operator 14. Alternatively, the head-up display is a windscreen of the aircraft 12.

In particular, each avionics system 10 is configured to implement a critical avionics function. The critical avionics function is typically selected from the group consisting of: A flight control of the aircraft 12, a trajectory calculation of the aircraft 12, a communication of the aircraft 12 with the control room 18, a change of communication frequency of the aircraft 12, an air traffic correction command etc.

However, the skilled person will understand that the invention is also suitable for other critical functions, such as a control process of a nuclear reactor, a temperature control in a factory furnace, a navigation control of an autonomous motor vehicle, a speed control of a railway vehicle, etc.

Each avionics system 10 is capable of operating within a current context defined by at least one operating parameter associated with said avionics system 10.

Each operating parameter is characteristic of the current context. The current context is the set of circumstances in which the avionics system 10 operates.

In particular, each operating parameter associated with the avionics system 10 is selected from the group consisting of:
- a flight parameter of the aircraft 12 associated with the avionics system 10;
- a flight plan associated with the aircraft 12;
- a mission assigned to the aircraft 12;
- a parameter from at least one avionics sensor;
- a weather parameter associated with the environment of the aircraft 12; and
- a physiological parameter of the operator 14.

The flight parameter may particularly be the geographical position of the aircraft 12, the altitude of the aircraft 12, the speed of the aircraft 12, or the heading of the aircraft 12.

In particular, the flight plan for the aircraft 12 comprises a set of planned waypoints for the aircraft 12 between the departure and destination airfields.

The mission of the aircraft 12 is the purpose of the flight of the aircraft 12, such as transporting passengers and/or goods to a certain destination, reconnaissance or surveillance of an area of interest, etc.

The weather parameter is for example the wind speed, the presence of bad weather, the visibility of the environment for the pilot, etc.

The physiological parameter is, for example, the heart rate of the operator 14 or a parameter representative of the state of consciousness of the operator 14.

Also shown in FIG. 1 is an electronic control device 24 for the avionics system(s) 10 to implement the critical avionics function associated with each avionics system 10.

Figure 2:
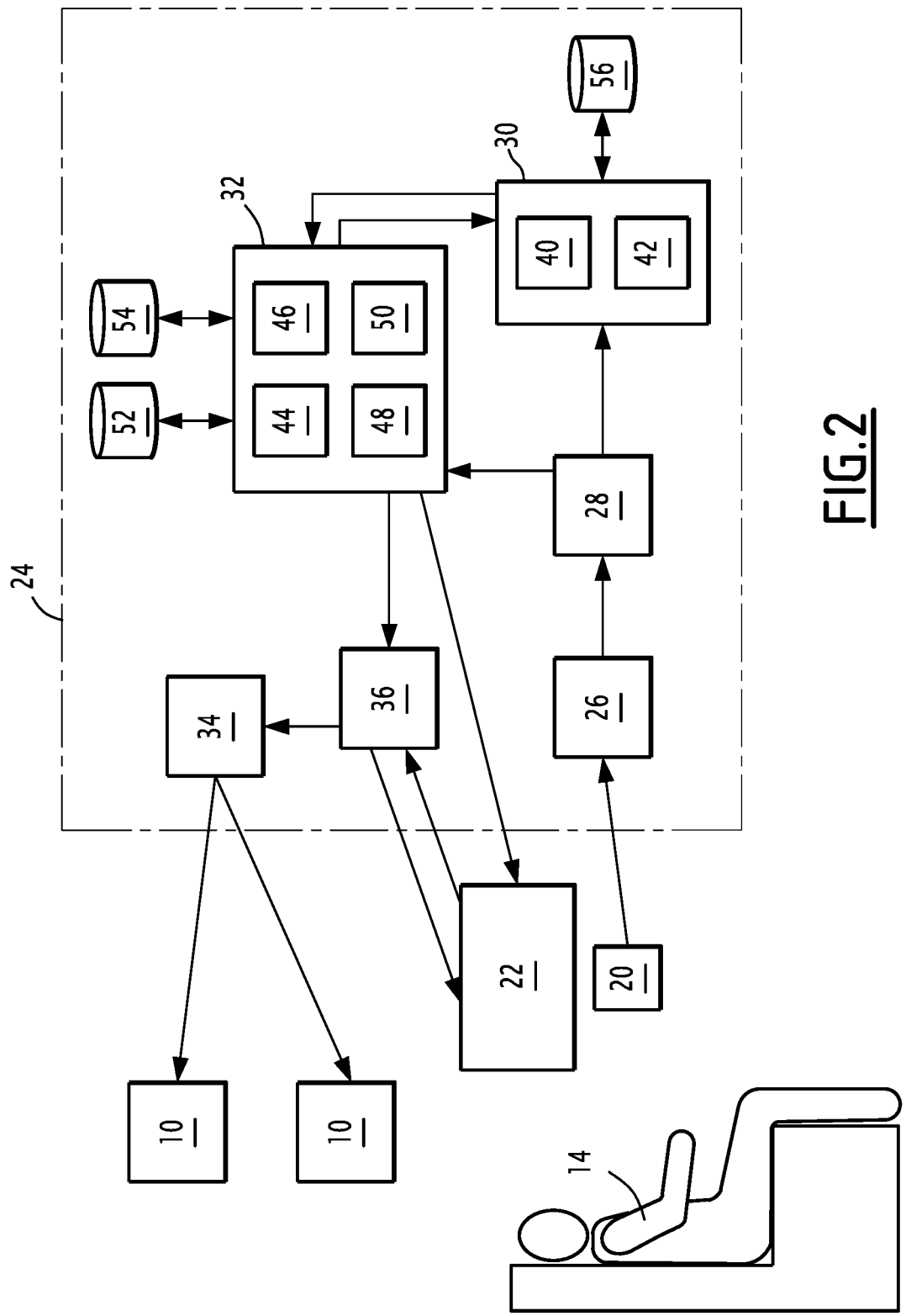
FIG. 2 is a schematic depiction of the electronic device according to the invention.

With reference to FIG. 2, the electronic device 24 comprises a reception module 26, a voice recognition module 28, a processing module 30 and a monitoring module 32.

Advantageously, the electronic device 24 further comprises a transmission module 34 and a validation module 36.

The reception module 26 is configured to receive a voice instruction signal picked up by the microphone 20. The voice instruction signal comes in particular from the operator 14 in the control station 16. The voice instruction signal is an analogue or digital signal.

The voice instruction signal is in particular a command issued by the operator 14 based on key words or a request expressed in natural language, for example during a dialogue between air traffic control and the pilot.

The reception module 26 is further configured to receive the current context. In particular, the reception module 26 is configured to receive the operating parameter(s) associated with the avionics system 10 and enabling the current context to be characterised. The reception module 26 is suitable for receiving, for example, the flight parameters from the flight control system or the flight plan from the FMS (Flight Management System).

The speech recognition module 28 is configured to receive the voice instruction signal from the reception module 26 and to transform the voice signal into a textual transcript of the voice signal.

In particular, the speech recognition module 28 is configured to process the voice signal in order to recognise the individual words in it. The speech recognition module 28 is adapted to output the transcribed text as a text or sequence of words.

Speech recognition is implemented, for example, by digitising and parameterising the voice signal by a frequency analysis technique using the Fourier transform. Alternatively, a machine learning algorithm takes the voice signal directly as input without preprocessing. The machine learning algorithm performs an association between elementary segments of the voice signal and lexical items. This association is based on statistical modelling using, among others, hidden Markov models and/or artificial neural networks. Finally, a decoding is carried out by concatenating the previously learned elementary models in order to reconstruct the textual transcript.

The processing module 30 is configured to receive the textual transcript from the speech recognition module 28 and to perform processing of the textual transcript to associate the textual transcript with at least one action to be performed for the avionics system 10.

The action to be performed comprises in particular an action that can be performed by the avionics system 10 and advantageously a value and one or more criteria. For example, where the avionics system 10 is a flight control system, the action to be taken may be represented as {action=change aircraft altitude, value=10,000 m above ground level, criterion=meet safe rate of climb}. As another example, when the avionics system 10 is a communication system, the action to be performed may be represented as {action=change frequency, value=118.100}. As a further example, where the avionics system 10 is a trajectory calculation system, the action to be taken may be represented as {action=calculate distance from current position to airport, criterion=minimise distance}.

The processing module 30 advantageously comprises an automatic language processing module 40 and a natural language understanding module 42.

The automatic language processing module 40 is in particular a so-called "NLP" component (for "Natural language processing").

The automatic language processing module 40 is configured to perform at least one process selected from:
- a lemmatisation of the textual transcript;
- a stemming of the textual transcript;
- recognition of keywords and/or named entities in the textual transcript.

For example, if the voice command is "Changing frequency to 118.100", the automatic language processing module 40 is able to root the word "changing" to "change", recognise the keywords "frequency" and "change" and recognise the entity "frequency number 118.100". Thus, the automatic language processing module 40 transforms the voice command "Changing frequency to 118.100" into the action {action=change frequency, value=118.100}.

Advantageously, the automatic language processing module 40 is adapted to detect a predetermined keyword that the operator 14 indicates at the beginning of his voice command in order to indicate to the electronic device 24 that the continuation of the voice signal is indeed a voice command intended for the avionics system 10.

As will be explained later, the natural language understanding module 42 is adapted to operate in addition to the automatic language processing module 40 when the processing performed by the automatic language processing module 40 is insufficient to produce an action to be performed.

The natural language understanding module 42 is in particular a so-called "NLU" component (for "Natural language understanding").

The natural language understanding module 42 is configured to perform at least one process selected from:
- recognising textual patterns in textual transcript;
- associating the textual transcript with at least one concept stored in a database 56;
- using a semantic engine to link sequences of words in the textual transcript to at least one concept; and
- applying a neural network to detect feelings and/or intentions in the textual transcript.

For example, if the voice command is "Finding me the nearest airport", the automatic language processing module 40 performs a root of "finding" into "find" and detects the keywords "find" and "airport". This processing is insufficient here to obtain an action to be performed. The natural language understanding module 42 then retrieves the keywords "find" and "airport" and extracts from the words "find airport" the concept of "calculate current location distance to an airport" using a table containing this association. Then it extracts from the words 'closest' the concept of 'minimising distance'. Thus, the natural language understanding module 42 is suitable for providing the following action to be performed: {action=calculate distance from current position to airport, criterion=minimise distance}.

If, after processing by the natural language understanding module 42, there is still uncertainty about the action to be taken, the processing module 30 is able to generate several associated actions to be taken. As will be described later, the operator 14 can then choose the command corresponding to his voice command.

The monitoring device 32 is configured to receive the text transcript and/or the action to be taken.

Thus, in one embodiment, the monitoring device 32 is configured to receive only the textual transcript.

Alternatively, the monitoring device 32 is configured to receive only the action to be performed.

In yet another variant, the monitoring device 32 is configured to receive the text transcript and the action to be taken.

The monitoring device 32 is configured to verify that the action to be performed is valid. For this purpose, the monitoring device 32 comprises a control module 44, a generating module 46 and, advantageously, an alert module 48 and an activation module 50.

The control module 44 is configured to check whether the textual transcript and/or the action to be performed is consistent according to at least one predetermined consistency rule.

Thus, when the monitoring device 32 receives only the textual transcript, the control module 44 checks only the textual transcript. When the monitoring device 32 receives only the action to be performed, the control module 44 checks only the action to be performed. When the monitoring device 32 receives the textual transcript and the action to be performed, the control module 44 checks both the textual transcript and the action to be performed.

The textual transcript and/or the action to be performed is considered consistent according to the consistency rule if and only if:

a) the textual transcript and/or the action to be performed is consistent with the expected syntax according to a predetermined database 52 of syntax rules,
b) the textual transcript and/or the action to be performed is consistent with the expected lexical field according to a predetermined database 54 of the expected lexical field in the current context of the avionics system 10, and
c) the textual transcript and/or the action to be performed is consistent with the current context of the avionics system 10, The predetermined database 52 of syntactic rules comprises in particular spelling and grammar rules relating to the language used by the operator 14 to define whether a sentence is syntactically correct.

The monitoring device 32 advantageously comprises a language module configured to detect in which language the operator communicates and to activate the corresponding syntax rule database. Alternatively, the operator 14 indicates in which language he communicates with the electronic device 24. Alternatively, the language is predetermined.

The predetermined database 54 of the expected lexical field comprises, for the different common contexts encountered by the avionics system 10, an associated lexical field. For example, this database 54 comprises a lexical field associated with take-off, a lexical field associated with flight, a lexical field associated with tactical missions, etc.

The control module 44 is adapted to check whether the textual transcript and/or the action to be performed is consistent with the current context of the avionics system 10, by comparing the operating parameters of the current context with the operating parameters that the command would entail. In particular, a deviation above a predetermined threshold indicates an inconsistency. For example, a flight command resulting in a very large drop in altitude is inconsistent with a local cruising flight context.

The control module 44 is configured to check that the action to be taken is realistic, feasible, and consistent with the context.

For example, in the context of an aircraft 12 flying over the Atlantic Ocean, the textual transcript "New York to Navigate" is not valid from the point of view of syntactic rules. In the same context, the textual transcript "Rolling on flight level FL300" is not valid from the point of view of the lexical field of flight. Indeed, the term "rolling" is not part of the lexical field of flight. Again in the same framework, the action to be performed {action=change destination, value=Tokyo} is not consistent with the context of a flight over the Atlantic Ocean. In particular, the control module 44 detects that the distance between the aircraft 12 and the new destination is too great.

The generating module 46 is configured to generate a command associated with the action to be performed only if no inconsistency is detected by the control module 44. In other words, the generating module 46 is configured to generate the command the action to be performed only if the three conditions according to the consistency rule a), b) and c) are met.

The alert module 48 is configured to generate an alert signal when an inconsistency is detected by the control module 44.

Advantageously, the alert module 48 is configured to send the alert signal to the display 22 so that the operator 14 can be informed of the alert and issue a new corrected control signal to the avionics system 10.

The activation module 50 is configured to activate the automatic language processing module 40.

In particular, the activation module 50 is configured to activate the automatic language processing module 40 when the reception module 26 receives a voice signal or the processing module 30 receives the textual transcript.

The activation module 50 is further configured to analyse whether the action to be performed obtained by the processing performed by the automatic language processing module 40 allows the generating of a command by the generating module 46.

In particular, the activation module 50 analyses whether the generating module 46 is capable of generating an action, a value and/or a criterion in order to completely define the command to the avionics system 10.

Using the examples above, if the voice command is "Changing frequency to 118.100", the automatic language processing module 40 transforms this voice command into the action to be performed {action=change frequency, value=118.100}. The generating module 46 is then able to generate the associated command clearly and completely.

Conversely, if the voice command is "Finding me the nearest airport", the automatic language processing module 40 detects the keywords "find" and "airport". However, this processing is insufficient here to obtain an action to be performed because the generating module 46 is unable to define the criterion associated with the airport search.

To this end, the activation module 50 is configured to activate the natural language understanding module 42 only if the action to be performed does not allow the generating of a command by the generating module 46.

In the above example, activation of the natural language understanding module 42 detects the concept of "calculate distance from current position to an airport". Thus, the natural language understanding module 42 is suitable for providing the following action to be performed: {action=calculate distance from current position to airport, criterion=minimise distance} and the generating module 46 is suitable to generate The transmission module 34 is configured to transmit the command to the corresponding avionics system 10 for implementation of the critical avionics function.

The transmission module 34 is thus configured to analyse the command and send it to the avionics system 10 corresponding to said command.

The validation module 36 is configured to display the command to the operator 14 of the avionics system 10 prior to transmission of the command to the avionics system. In particular, the validation module 36 is configured to display information on the display screen 22 in front of the operator 14.

When multiple commands are generated by the generating module 48, the validation module 36 is configured to display the different commands.

The validation module 36 is configured to receive a validation of each command from the operator 14 and to send the command to the transmission module 34 only after receiving the validation of the command from the operator 14.

For example, when the command is displayed on the display screen 22, the validation module 36 is adapted to display a validate button and/or a deny button for transmitting the command to the avionics system 10.

When several commands are displayed, the validation module 36 is able to display a validate button next to each command in order to validate it or not.

In the example shown in FIG. 2, the electronic device 24 comprises an information processing unit formed for example by a memory and a processor associated with the memory. The reception module 26, the speech recognition module 28, the processing module 30, the monitoring device 32, and in the optional supplement the transmission module 34 and the validation module 36, are each in the form of software, or a software brick, which can be executed by the processor. The memory is then able to store reception software, speech recognition software, processing software, monitoring software and optionally, transmission software and validation software. The processor is then able to run each of these programs.

In a variant not shown, the reception module 26, the speech recognition module 28, the processing module 30, the monitoring device 32, and in the optional supplement the transmission module 34 and the validation module 36, are each in the form of a programmable logical component, such as a FPGA (Field-Programmable Gate Array), or as a dedicated integrated circuit, such as an ASIC (Application-Specific Integrated Circuit).

When the electronic device 24 is in the form of one or more software, that is to say in the form of a computer program, it is also capable of being stored on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example EPROM, EEPROM, FLASH, NVRAM), magnetic card or optical card. The readable medium in such a case stores a computer program comprising software instructions.

Figure 3:
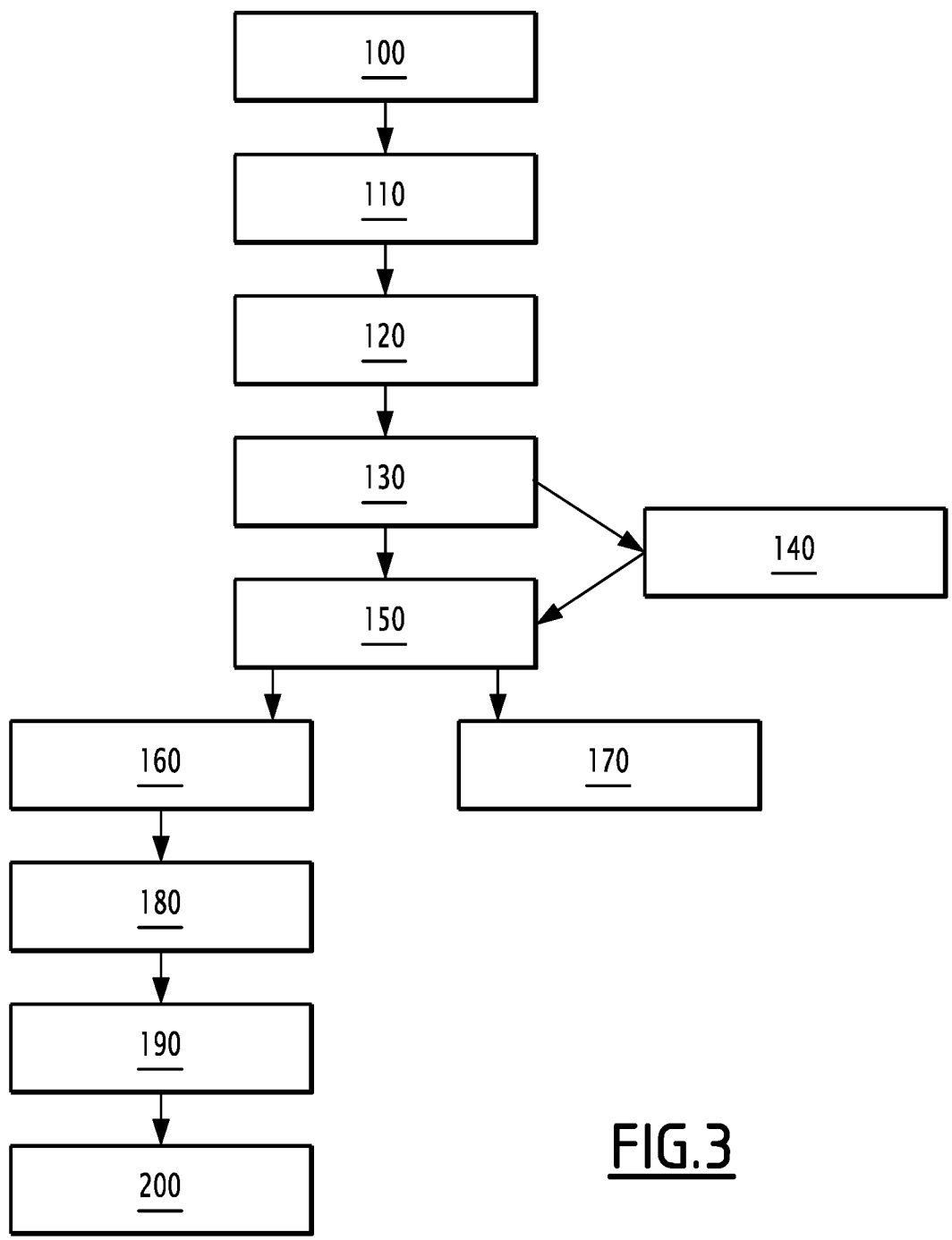
FIG. 3 is a flowchart of a method according to the invention of controlling an avionics system to implement a critical avionics function by the electronic device.

The operation of the electronic control device 24 according to the invention will now be explained with the help of FIG. 3 depicting a flowchart of the method according for controlling an avionics system 10 for the implementation of a critical avionics function.

Initially, an operator 14 is installed in the control station 16.

The control station 16 is installed in an aircraft 12 or on the ground, for example in a control room 18, as shown in FIG. 1.

The operator 14 then issues a voice instruction to an avionics system 10 to implement a critical avionics function.

By way of example, which will be developed later, the voice instruction issued by the operator 14 in the aircraft 12, for example the pilot, is for example "Assistant, can you set VHF1 to one hundred twenty-six?".

In an initial step 100, the reception module 26 receives the voice instruction signal acquired by the microphone 20 arranged in the control station 16 facing the operator.

The reception module 26 also receives the local context. For example, the reception module 26 receives the geographical position and speed of the aircraft 12, the weather conditions of the environment of the aircraft 12, the state of consciousness of the operator 14, etc.

Then, in a step 110, the speech recognition module 28 receives the voice instruction signal from the reception module 26 and transforms the voice signal into a textual transcript of the voice signal.

In an optional step 120, the activation module 50 then activates the processing module 30 and in particular the automatic language processing module 40 after the reception module 26 has received the voice signal or the processing module 30 has received the text transcript.

Next, in a step 130, the processing module 30 receives the textual transcript from the speech recognition module 28 and performs processing of the textual transcript to associate the textual transcript with at least one action to be performed for the avionics system 10.

In particular, the automatic language processing module 40 performs at least one process selected from:
 a lemmatisation of the textual transcript;
 a stemming of the textual transcript;
 recognition of keywords and/or named entities in the textual transcript.

In the case of the above example, the automatic language processing module 40 performs a processing of the command "Assistant, can you set VHF1 to one hundred twenty-six?" and detects the keywords "assistant", "VHF1" "set" "one hundred twenty-six". However, this processing is insufficient to obtain an action to be performed. The automatic language processing module 40 thus detects the keyword "assistant" and understands that the rest of the voice command is a command to be processed.

In an optional step 140, the activation module 50 activates the natural language understanding module 42 only if the action to be performed does not allow the generating of a command by the generating module 46.

Also in the same example, the natural language understanding module 42 detects the action "set" and detects that "VHF1" is one of a list of radios available for the action "set". The natural language understanding module 42 queries the associated avionics system 10, in this case the RMS (Radio Management System), for available frequencies from "one hundred twenty-six". The RMS responds with the frequencies it knows, particularly with regard to what the operator 14 has said, depending on the current and projected position of the aircraft 12, the possible range of the radio frequency, etc. The natural language understanding module 42 then detects that the frequencies "126.0 MHz" and "120.6 MHz" are possible. The processing module 30 then associates the two actions to be performed {action=set VHF1 radio frequency, value=126.0} and {action=set VHF1 radio frequency, value=120.6} with the textual transcript.

Then, in step 150, the control module 44 checks whether the textual transcript and/or the action to be performed is consistent according to at least one consistency rule, in particular whether the three conditions according to the consistency rule a), b) and c) listed above are met.

In the context of the example, the control module 44 checks the consistency of the textual transcript "Assistant, can you set VHF1 to one hundred twenty-six?" and/or of the actions to be performed {action=set VHF1 radio frequency, value=126.0} and {action=set VHF1 radio frequency, value=120.6}. Here, the control module 44 does not detect any inconsistencies.

If no inconsistencies are detected, then the module 48 generates a control signal associated with the action to be performed in a step 160.

When an inconsistency is detected by the control module 44, the alert module 48 generates an alert signal in a step 170. In particular, the alert module 48 sends the alert signal to the display screen 22 so that the operator 14 can be informed of the alert. After step 160, in a step 180, the validation module 36 receives each command before transmission to the transmission module 34.

The validation module 36 then displays the command on the display screen 22 to the operator 14. When multiple commands are generated by the generating module 48, the validation module 36 displays the different commands.

In the example, the validation module 36 displays, for example, "Set VHF1 to 126.0 MHz" and "Set VHF1 to 120.6 MHz" on display screen 22. The operator 14 can then validate the command he wants, here "Set VHF1 to 120.6 MHz".

In a step 190, the validation module 36 receives validation of each command from the operator 14 and sends the command to the transmission module 34 only after receiving validation of the command from the operator 14.

Then in a step 200, the transmission module 34 transmits the command to the corresponding avionics system 10 for implementation of the critical avionics function. In particular, the transmission module 34 analyses the command and sends it to the avionics system 10 corresponding to said command.

In the example, the transmitter module 34 detects that the commands associated with the actions to be performed {action=set VHF1 radio frequency, value=126.0} and {action=set VHF1 radio frequency, value=120.6} are for the RMS.

The avionics system 10 then receives the command and implements the critical avionics function.

For example, the RMS changes the frequency of the VHF1 radio to 120.6 Mhz.

It is therefore clear that the present invention has a number of advantages.

For instance, the monitoring device 32 checks that the command generated by the processing module 30 is syntactically and semantically consistent with the current context, i.e. that the command is realistic and feasible for the avionics system 10 in the current context.

The invention allows the operator 14 to be alerted if an inconsistent command is detected and thus the critical avionics system 10 does not perform the inconsistent command which could have potentially serious consequences for the safety of the aircraft 12 and its environment.

In this way, the invention simplifies the communication of the operator 14 with the various avionics systems 10 while providing a high degree of safety for the implementation of a critical avionics function.

This simplification and validation of the controls reduces the mental load on the operator 14, who is then better able to manage the various complex situations he encounters during the flight or control of the aircraft 12.

Thus, the invention allows for an improvement in both operator comfort 14 and safety, particularly with regard to the important safety requirements in the avionics field.

The invention claimed is:

1. A method of controlling an avionics system to implement a critical avionics function, the critical avionics function being selected from the group consisting of: a flight control of an aircraft, a trajectory calculation of the aircraft, a communication of the aircraft with a control room, a change of communication frequency of the aircraft and an air traffic correction command, the avionics system being suitable for operation in a current context defined by at least one operating parameter associated with the avionics system, the current context being a set of circumstances in which the avionics system operates, the method being implemented by an electronic control device, the electronic control device including a memory and a processor, and comprising steps:
 receiving a voice instruction signal acquired by a microphone and receipt of a local context;
 transforming the voice signal into a textual transcript of the voice signal,
 processing the textual transcript in order to associate the textual transcript with at least one action to be performed for the avionics system;

checking whether the textual transcript or the action to be performed is consistent according to at least one predetermined consistency rule, the textual transcript or the action to be performed being considered consistent according to the consistency rule when:
  a) the textual transcript or the action to be performed is consistent with an expected syntax according to a predetermined database of syntax rules,
  b) the textual transcript the action to be performed is consistent with an expected lexical field according to a predetermined database of the expected lexical field in the current context of the avionics system, and
  c) the textual transcript or the action to be performed is consistent with the current context of the avionics system,
generating a control signal associated with the action to be performed when only if no inconsistencies are detected;
wherein the processing further includes an automatic language processing which includes at least one process selected from:
a lemmatisation of the textual transcript;
a stemming of the textual transcript;
recognition of keywords and named entities in the textual transcript; and
wherein the processing further includes a natural language understanding processing which includes at least one process selected from:
recognising textual patterns in textual transcript;
associating the textual transcript with at least one concept stored in a database;
using a semantic engine to link sequences of words in the textual transcript to at least one concept; and
applying a neural network to detect feelings and/or and intentions in the textual transcript; and
wherein checking further includes:
activating the automatic language processing;
analyzing whether the action to be performed obtained by the processing performed by the automatic language processing allows the generating of a command; and
activating the natural language understanding when the action to be performed does not allow the generating of a command.

2. A non-transitory computer-readable medium including a computer program comprising software instructions which, when executed by a computer, implement a method according to claim 1.

3. An electronic control device for an avionics system for implementing a critical avionics function, the avionics system being suitable for operating according to a current context defined by at least one operating parameter associated with the avionics system, the electronic control device comprising:
  a reception module configured to receive a voice instruction signal picked up by a microphone and to receive the current context;
  a speech recognition module configured to transform the voice signal into a textual transcript of said voice signal;
  a processing module configured to carry out a processing of a textual transcript in order to associate the textual transcript with at least one action to be performed for the avionics system;
  a monitoring device configured to receive a text transcript and the action to be performed, the monitoring device comprising:
    a control module configured to check whether the textual transcript and the action to be performed is consistent according to at least one predetermined consistency rule, the textual transcript and the action to be performed being considered consistent according to the consistency rule when:
      a) the textual transcript and the action to be performed is consistent with an expected syntax according to a predetermined database of syntax rules,
      b) the textual transcript and the action to be performed is consistent with an expected lexical field according to a predetermined database of the expected lexical field in the current context of the avionics system, and
      c) the textual transcript and the action to be performed is consistent with the current context of the avionics system,
    a generating module configured to generate a command associated with the action to be performed when no inconsistency is detected by the control module;
  wherein the processing module comprises an automatic language processing module configured to perform at least one process selected from:
  a lemmatisation of the textual transcript;
  a stemming of the textual transcript;
  recognition of keywords and named entities in the textual transcript;
  wherein the processing module comprises a natural language understanding module configured to perform at least one process selected from:
  recognising textual patterns in textual transcript;
  associating the textual transcript with at least one concept stored in a database;
  using a semantic engine to link sequences of words in the textual transcript to at least one concept; and
  applying a neural network to detect feelings and intentions in the textual transcript; and
  wherein the monitoring device further comprises an activation module configured to:
  activate the automatic language processing module;
  analyse whether the action to be performed obtained by the processing performed by the automatic language processing module allows the generating of a command by the generating module;
  activate the natural language understanding module when the action to be performed does not allow the generating of a command by the generating module.

4. The electronic device according to claim 3, wherein the electronic device comprises a transmission module configured to transmit the command to the avionics system for implementation of the critical avionics function.

5. The electronic device according to claim 4, wherein the electronic device further comprises a validation module configured to display the command to an operator of the avionics system prior to transmission of the command to the avionics system, the validation module being configured to receive validation of each command from the operator and to send the command to the transmission module only after receipt of validation of the command by the operator.

6. The electronic device according to claim 3, wherein the monitoring device further comprises an alert module configured to generate an alert signal when an inconsistency is detected by the control module.

7. The electronic device according to claim 3, wherein each operating parameter associated with the avionics system is selected from the group consisting of:
  a flight parameter of an aircraft associated with the avionics system;

a flight plan associated with the aircraft;
a mission assigned to the aircraft;
a parameter from at least one avionics sensor;
a weather parameter associated with an environment of the aircraft; and
a physiological parameter of an operator of the avionics system.

* * * * *